United States Patent [19]
Sidwell

[11] Patent Number: 6,100,905
[45] Date of Patent: *Aug. 8, 2000

[54] EXPANSION OF DATA

[75] Inventor: Nathan Mackenzie Sidwell, Bristol, United Kingdom

[73] Assignee: SGS-Thomson Microelectronics Limited, Almondsbury Bristol, United Kingdom

[*] Notice: This patent is subject to a terminal disclaimer.

[21] Appl. No.: 08/660,731

[22] Filed: Jun. 6, 1996

[30] Foreign Application Priority Data

Jul. 3, 1995 [GB] United Kingdom .................... 9513515

[51] Int. Cl.[7] ...................................................... G06F 9/00
[52] U.S. Cl. .......................... 345/501; 345/509; 345/513; 345/521; 345/523
[58] Field of Search ............................ 364/518; 395/501, 395/509; 345/501, 509, 513, 521, 523

[56] References Cited

U.S. PATENT DOCUMENTS

| | | | |
|---|---|---|---|
| 4,878,181 | 10/1989 | MacKenna et al. | 364/518 |
| 5,095,301 | 3/1992 | Guttag et al. | 340/703 |
| 5,119,082 | 6/1992 | Lomelsk et al. | 340/731 |
| 5,283,561 | 2/1994 | Lumelsky et al. | 340/721 |
| 5,327,254 | 7/1994 | Daher | 358/426 |
| 5,442,751 | 8/1995 | Patrick et al. | 395/250 |
| 5,542,041 | 7/1996 | Corona | 395/162 |
| 5,675,382 | 10/1997 | Bauchspies | 348/390 |
| 5,859,790 | 1/1999 | Sidewall | 364/754.02 |

FOREIGN PATENT DOCUMENTS

| | | | |
|---|---|---|---|
| 63-21694 | 1/1988 | Japan | G09G 1/28 |
| WO-A-90 05334 | 5/1990 | WIPO | G06F 7/02 |

OTHER PUBLICATIONS

Standard Search Report issued by the European Patent Office dated Jan. 18, 1996.

Proceedings of the Symposium on Frontiers of Massively Parallel Computation, Maryland,Oct. 8–10, 1990 no. SYMP, 3, Oct. 8, 1990 Jaja J., pp. 390–396, Albert E. et al., "Data Parallel Computers and the Forall Statement".

IBM Technical Disclosure Bulletin, vol. 31, No. 6, Nov. 1988 New York, US, pp. 62–63, "Packed and Plane Color Support System".

*Primary Examiner*—Zarni Maung
*Assistant Examiner*—Saleh Najjar
*Attorney, Agent, or Firm*—Wolf, Greenfield & Sacks, P.C.; James H. Morris; Theodore E. Galanthay

[57] ABSTRACT

A computer instruction is described which expands compressed font information to provide an expanded format suitable for driving a display for example. The expansion is carried out by identifying a bit string having at least one bit sequence, selecting each bit of the bit sequence and replicating each selected bit at a plurality of adjacent locations. This is carried out in a register store having a predetermined bit capacity addressable by a single address.

The instruction is particularly useful for generating background or foreground font information for driving a display.

26 Claims, 6 Drawing Sheets

| SYMBOL | OPERATION |
|---|---|
|  | ARITHMETIC LOGIC UNIT. COMBINES THE TWO SOURCE VALUES IN SOME MANNER TO PRODUCE A PESULT. |
|  | BUFFER. THIS PARTICULAR ONE HAS AN INPUT WHICH IS UNSEPARATED AND FOUR SEPARATED OUTPUTS, EACH TAKING ONE QUARTER OF THE INPUT SIGNALS, IT ALSO HAS AN OUTPUT ENABLE INPUT. |
|  | MULTIPLEXER. THE OUTPUT CONSISTS OF ONE OF THE TWO INPUT SIGNALS. WHEN THE CONTROL SIGNAL IS NOT ASSERTED, THE UNSHADED INPUT SIGNAL IS OUTPUT, WHEN THE CONTROL SIGNAL IS ASSERTED, THE SHADED INPUT SIGNAL IS OUTPUT. |
|  | CHANGEOVER SWITCH. EACH OF THE TWO OUTPUTS CONSISTS OF ONE OF THE INPUT SIGNALS. WHEN THE CONTROL SIGNAL IS NOT ASSERTED, THE UNSHADED INPUT GOES TO THE UNSHADED OUTPUT AND THE SHADED INPUT GOES TO THE SHADED OUTPUT. WHEN THE CONTROL SIGNAL IS ASSERTED, THE OUTPUTS SWAP OVER. |

EXPANSION OF DATA

FIELD OF THE INVENTION

The present invention relates to expansion of data in a computer. It is particularly but not exclusively concerned with expansion of data to generate a set of pixel values for defining the display status of pixels of a display.

BACKGROUND TO THE INVENTION

It is frequently necessary to generate for a computer display pixel values for pixels in first and second regions of the display. Pixels in each region of the display will share a common characteristic, such as colour. One example is to generate a character or other image on a display, the image defining a first region of the display and being displayed in a foreground colour, while the second region of the display is a background having a background colour. Fonts for defining such characters or images are often stored using one bit for each pixel. For example, a zero indicates the background and a one indicates the foreground.

In contrast, video display devices often require several bits to define each pixel, in order to display several colours simultaneously. Thus, each pixel value is represented by a sequence of bits, for example 8 or 32 bits.

In order to display a stored font on such a display device, it is therefore necessary to expand the compressed font information so that each pixel is represented by the required length of bit sequence used by the display device.

In existing systems, this is done by using the single bit font data word by word to address a look-up table which holds the full, expanded mask for each word. This requires that the look-up table be held in memory, using up a large amount of memory capacity. This can have a negative impact on cache accesses and can slow down the computer system.

In one aspect, the present invention provides a simple and effective way of carrying out this expansion in a computer system.

SUMMARY OF THE INVENTION

According to one aspect of the present invention there is provided a method of generating a data string in a register store having a predetermined bit capacity addressable by a single address, the method comprising:
  identifying a bit string having at least one bit sequence of a number of bits which is less than said predetermined bit capacity;
  selecting each bit of said bit sequence; and
  replicating each selected bit at a plurality of adjacent locations in said register store to generate said data string having a bit length matching said bit capacity and consisting of said number of expanded bit sequences each comprising a plurality of said replicated bits.

Where the identified bit string comprises a plurality of adjacent bit sequences, the method comprises selecting one of the bit sequences for replication.

The identified bit string can have a bit length matching the bit length of the generated data string.

In the preferred embodiment, the adjacent bit sequences are arranged in the identified bit string in a ordered manner between a most significant bit sequence and a least significant bit sequence, wherein the bits of the least significant bit sequence are selected for replication. This has the advantage that in a physical implementation of the invention there is no need to identify the sequence to be expanded. If the identified bit string is always located in a register store with the least significant bit sequence at predetermined locations within the register store, then that bit sequence will automatically be replicated. If a next bit sequence in the identified bit string is to be replicated, all that is required is to shift the bit sequences within the register so that the next significant bit sequence occupies the predetermined locations for the least significant bit sequence.

The identified bit string can be held in a register store having a bit capacity addressable by a single address and which is the same as the predetermined bit capacity.

In one embodiment, the register store has 64 bit locations, the number of bits is 8 and each expanded bit sequence is one byte long.

In one arrangement, a first such register store holds the identified bit string and a second such register store provides successive locations for the generated data string. It would of course be possible to use the first such register store for holding the generated data string, overwriting the identified bit string.

In the described embodiment, the bits are replicated in said adjacent locations simultaneously via a plurality of respective data paths. This allows simultaneous replication of the bits in a simple bit expansion unit.

The invention further provides a method of operating a computer which method comprises holding in data storage at least one bit sequence forming a sub-string of a data string, said method further comprising:
  executing an instruction sequence including at least one expand instruction, the or each expand instruction replicating each bit of said at least one bit sequence at a plurality of adjacent locations in a register store having a predetermined bit capacity addressable by a single address to generate a new data string having a bit length matching said bit capacity and consisting of a number of expanded bit sequences each comprising a plurality of said replicated bits.

In yet a further aspect, the invention provides a computer comprising a processor, memory and data storage circuitry for holding bit sequences each forming a sub-string within a data string, said computer having stored in said memory an instruction sequence comprising a first instruction which selects one of said sub-strings within the data string and replicates each bit of the selected sub-string at a plurality of adjacent locations to generate a new data string consisting of a number of sub-strings each comprising a plurality of replicated bits, and a second instruction which designates a common operation on at least some sub-strings of the new data string without identification of said sub-strings within the data string.

The invention also provides a method of operating a computer which method comprises holding in data storage a plurality of bit sequences each forming one of a plurality of sub-strings of a data string, executing a first instruction which selects at least one of said sub-strings within the data string and replicates each bit of the selected sub-string at a plurality of adjacent locations to generate a new data string consisting of a number of sub-strings each comprising a plurality of replicated bits, and executing a second instruction which effects a common operation on at least some sub-strings of the new data string without identification of said sub-strings within the data string.

In a bit expansion unit, the data string can be held in an input buffer and the new data string can be generated in an output buffer by simultaneous replication of bits of the selected sub-string via a plurality of respective data paths located between the input buffer and the output buffer.

A useful common operation is a bit-wise AND between said at least some sub-strings of the new data string and another data string.

The present invention is particularly useful when used to generate a set of pixel values for defining the display status of a plurality of pixels of a display having first and second display regions. According to a further aspect of the invention, such a method comprises:

identifying in a computer store a bit sequence comprising a number of bits, each bit indicating whether a pixel represented by that bit lies in the first or second display region;

generating a data string from said bit sequence by replicating each bit of said bit sequence at a plurality of adjacent locations whereby said data string consists of said number of expanded bit sequences, each comprising a plurality of said replicated bits;

combining said data string, using a logical AND operation, with at least one other data string consisting of a number of bit sequences, each bit sequence having the same number of bits as each said expanded bit sequence, and each bit sequence of the other data string representing the colour of one of the first and second display regions, to generate a first pixel representation for that display region, said first pixel representation providing said set of pixel values.

Said data string can also be combined using a logical AND operation, with a second other data string to generate a second pixel representation and wherein said first and second pixel representations are combined using a logical OR operation to generate said set of pixel values.

The first and second display regions can be defined to accomplish various different effects. In one arrangement, the first region defines a clip mask in the second region. The clip mask defines a zone of the display within which an image can be defined.

In another arrangement, the first and second regions can be defined to fill in an area with two different colours according to a stipple pattern. In one convention, the stipple pattern is defined in a foreground colour, with the background colour being different.

Another common application is the definition of a character or image in a foreground colour on a background region.

For a better understanding of the present invention, and to show how the same may be carried into effect, reference will now be made by way of example to the accompanying drawings.

DESCRIPTION OF THE PREFERRED EMBODIMENT

Figure 1:
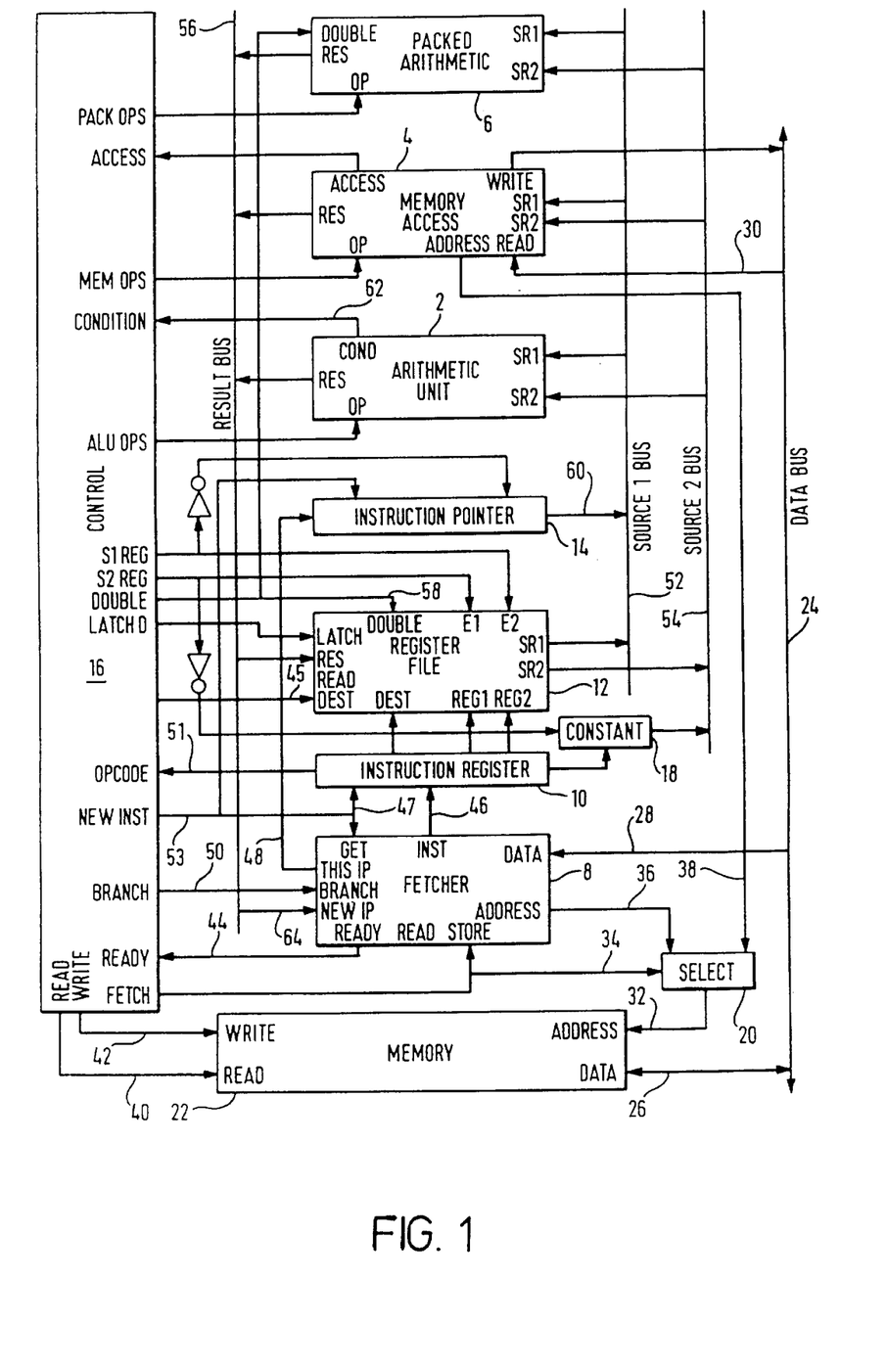
FIG. 1 is a block diagram of a processor and memory of a computer.

FIG. 1 shows a processor in accordance with one embodiment of the present invention. The processor has three execution units including a conventional arithmetic unit 2 and a memory access unit 4. In addition there is a packed arithmetic unit 6. The processor also includes an instruction fetcher 8, an instruction register 10, a register file 12 and an instruction pointer 14 all of which operate under the control of a control unit 16 of the processor. The register file comprises a set of registers each having a predetermined bit capacity and each being addressable with a single address. It is not possible to address individual locations within a register. When a register is accessed, the entire contents of the register are transferred. The processor further includes a constant unit 18 and a select unit 20. The constant unit 18 and select unit 20 are also operated under the control of the control unit 16. The processor operates in conjunction with a memory 22 which holds instructions and data values for effecting operations of the processor. Data values and instructions are supplied to and from the memory 22 via a data bus 24. The data bus 24 supplies data values to and from the memory 22 via a memory data input 26. The data bus 24 also supplies data to the instruction fetcher 8 via a fetcher data input 28 and to the memory access unit 4 via a memory access read input 30. The memory is addressed via the select unit 20 on address input 32. The select unit 20 is controlled via a fetch signal 34 from the control unit 16 to select an address 36 from the fetcher 8 or an address 38 from the memory access unit 4. Read and write control lines 40,42 from the control unit 16 control read and write operations to and from the memory 22. The instruction fetcher 8 fetches instructions from the memory 22 under the control of the control unit 16 as follows. An address 36 from which instructions are to be read is provided to the memory 22 via the select unit 20. These instructions are provided via the data bus 24 to the fetcher data input 28. When the instruction fetcher has fetched its next instruction, or in any event has a next instruction ready, it issues a Ready signal on line 44 to the control unit 16. The instruction which is to be executed is supplied to the instruction register 10 along instruction line Inst 46 and held there during its execution. The instruction pointer 14 holds the address of the instruction being executed supplied to it from the fetcher 8 via instruction pointer line 48. A Get signal 47 responsive to a New Inst signal 53 from the control unit 16 causes the instruction register 10 to store the next instruction on Inst line 46 and causes the fetcher 8 to prepare the next instruction. The New Inst signal 53 also causes the instruction pointer 14 to store the address of the next instruction. A branch line 50 from the control unit 16 allows the instruction fetcher 8 to execute branches.

The instruction register 10 provides Source 1 and Source 2 register addresses to the register file 12 as Reg1 and Reg2. A result register address is provided as Dest. Opcode is provided to the control unit 16 along line 51. In addition, some instructions will provide a constant operand instead of encoding one or both source registers. The constant is provided by the constant unit 18. The instruction's source values are provided on Source 1 and Source 2 busses 52,54 by the appropriate settings of the S1 Reg and S2 Reg signals at inputs E1,E2. The correct execution unit is enabled by providing the appropriate values for Pack Ops, Mem Ops and ALU Ops signals from the control unit 16 in accordance with the Opcode on line 51. The enabled unit will normally provide a result Res on a result bus 56. This is normally stored in the selected result register Dest in the register file 12. There are some exceptions to this.

Some instructions provide a double length result. These store the first part of the result in the normal way. In a subsequent additional stage, the second part of the result is stored in the next register in the register file 12 by asserting a Double signal 58.

Branches 50 need to read and adjust the instruction pointer 14. These cause the S1 Reg signal not to be asserted, and so the instruction pointer 14 provides the Source 1 value on line 60. The Source 2 value is provided in the normal way (either from a register in the register file 12, or the constant unit 18). The arithmetic unit 2 executes the branch calculations and its result is stored into the fetcher 8 on the New IP input 64, rather than the register file 12, signalled by the Branch line 50 from the control unit 16. This starts the fetcher from a new address.

Conditional branches must execute in two stages depending on the state of condition line 62. The first stage uses the Dest register as another source, by asserting a Read Dest signal 45. If the condition is satisfied, then the normal branch source operands are read and a branch is executed.

Calls must save a return address. This is done by storing the instruction pointer value in a destination register prior to calculating the branch target.

The computer described herein has several important qualities.

Source operands are always the natural word length. There can be one, two or three source operands.

The result is always the natural word length, or twice the natural word length. There is a performance penalty when it is twice the natural word length as it takes an extra stage to store and occupies two, rather than one, registers. For this computer, assume a natural word length of 64 bits. That is, each register in the register file has a predetermined capacity of 64 bits.

The execution units 2,4,6 do not hold any state between instruction execution. Thus subsequent instructions are independent.

Non-Packed Instructions

The arithmetic unit 2 and memory access unit 4, along with the control unit 16 can execute the following instructions of a conventional instruction set. In the following definitions, a register is used to denote the contents of a register as well as a register itself as a storage location, in a manner familiar to a person skilled in the art.

mov Move a constant or a register into a register add Add two registers together and store the result in a third register (which could be the same as either of the sources)

sub Subtract two registers and store the result in a third register load Use one register as an address and read from that location in memory, storing the result into another register store Use one register as an address and store the contents of another register into memory at the location specified by the address cmpe Compare two registers (or a register and a constant) for equality. If they are equal, store 1 into the destination register otherwise store zero cmpge Compare two registers (or a register and a constant) for orderability. If the second is not less than the first, store 1 into the destination register otherwise store zero jump Unconditional jump to a new location jumpz Jump to a new program location, if the contents of a specified register is zero jumpnz Jump to a new program location, if the contents of a specified register is not zero shr Perform a bitwise right shift of a register by a constant or another register and store the result in a destination register. The shift is signed because the sign bit is duplicated when shifting.

shl Perform a bitwise left shift of a register by a constant or another register and store the result in a destination register or/xor Perform a bit-wise logical operation (or/xor; and/andn and) on two registers and store result in destination register.

Packed Unit

Figure 2:
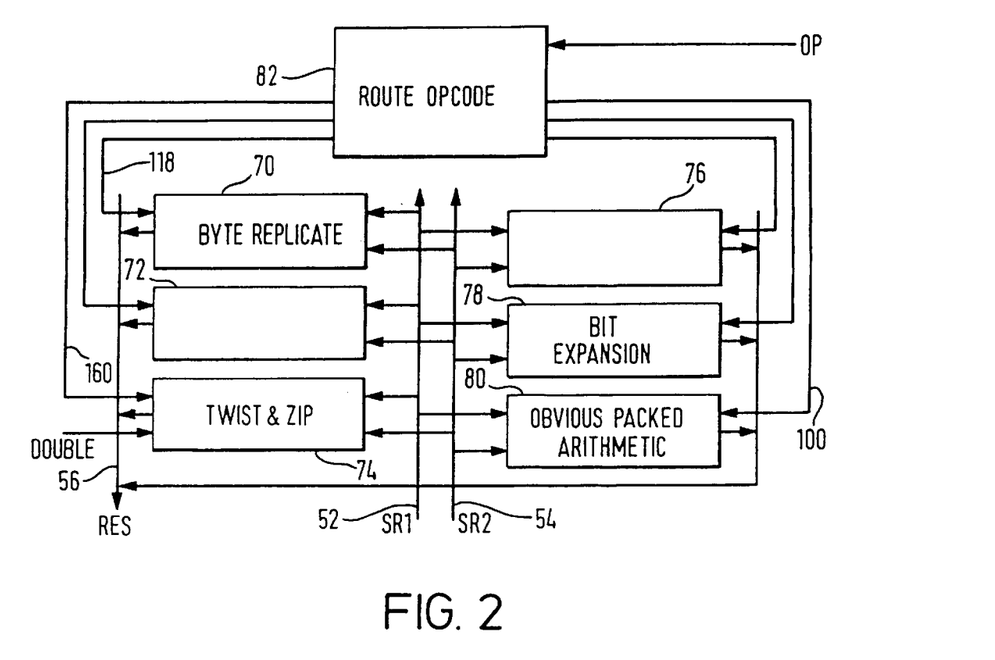
FIG. 2 is a block diagram of a packed arithmetic unit.

FIG. 2 shows in a block diagram the packed arithmetic unit 6. This is shown as a collection of separate units each responsible for some subset of packed arithmetic instructions. It is quite probable that another implementation could combine the functions in different ways. The units include a byte replicate unit 70, a twist and zip unit 74, an obvious packed arithmetic unit 80, a bit expansion unit 78 and other packed arithmetic units 72,76. Only the byte replicate unit, bit expansion unit and obvious packed arithmetic unit are described in detail herein. These are operated responsive to a route opcode unit 82 which selectively controls the arithmetic units 70 to 80. Operands for the arithmetic units 70 to 80 are supplied along the Source 1 and Source 2 busses 52,54. Results from the arithmetic units are supplied to the result bus 56. The op input to the route opcode unit 82 receives the Pack Ops instruction from the control unit 16 (FIG. 1). It will be appreciated that the operands supplied on the Source 1 and Source 2 busses are loaded into respective input buffers of the arithmetic units and the results supplied from one or two output buffers to one or two destination registers in the register file 12.

Obvious Packed Arithmetic

The obvious packed arithmetic unit 80 performs operations taking the two source operands as containing several packed objects each and operating on respective pairs of objects in the two operands to produce a result also containing the same number of packed objects as each source. The operations supported can be addition, subtraction, comparison, multiplication, left shift, right shift etc. As explained above, by addressing a register using a single address an operand will be accessed. The operand comprises a plurality of objects which cannot be individually addressed.

Figure 3:
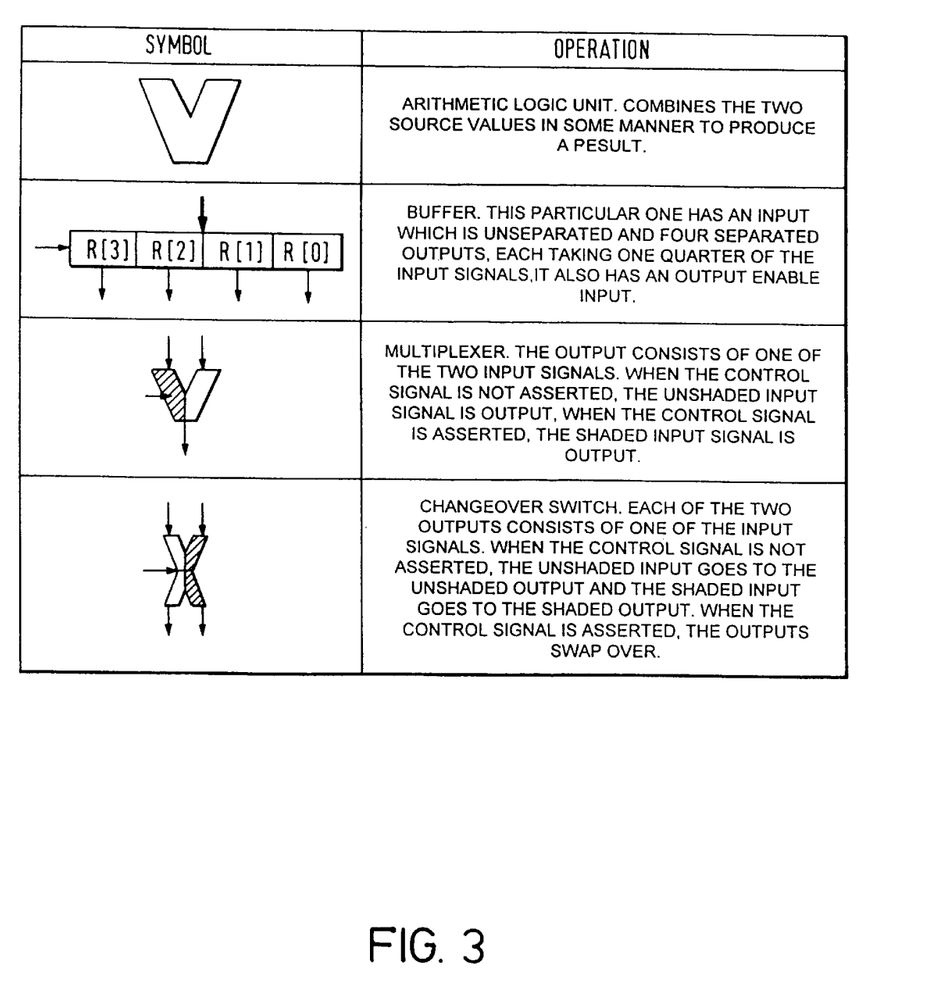
FIG. 3 shows the meaning of symbols used in the figures.

FIG. 3 shows the symbols used in the diagrams illustrating the arithmetic units of the packed arithmetic unit 6.

Figure 4:
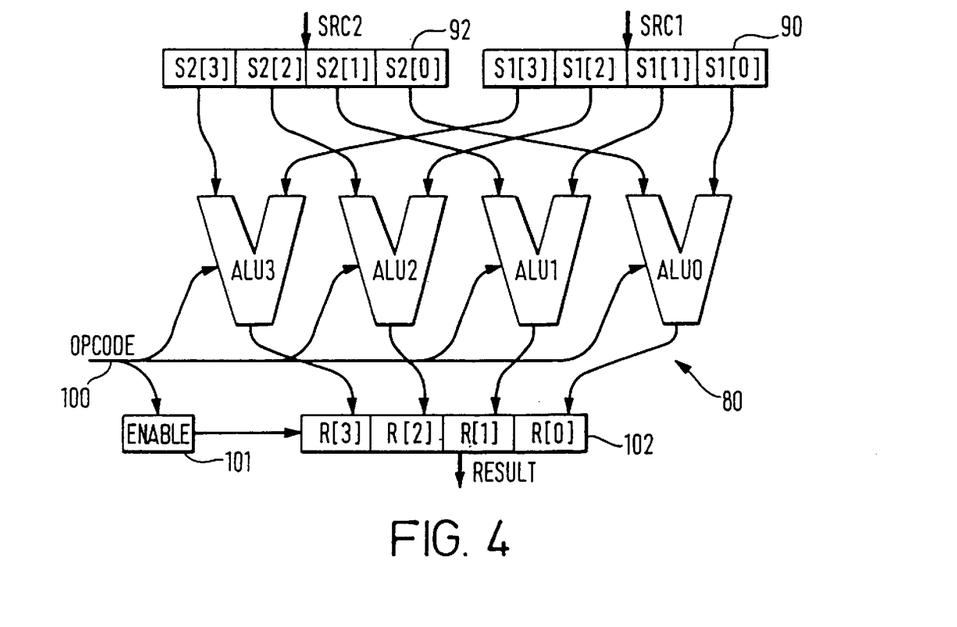
FIG. 4 is a block diagram of an obvious packed arithmetic unit operating on two packed source operands.

FIG. 4 shows an obvious packed arithmetic unit which can perform addition, subtraction, comparison and multiplication of packed 16 bit numbers. As, in this case, the source and result bus widths are 64 bit, there are four packed objects, each 16 bits long, on each bus.

The obvious packed arithmetic unit 80 comprises four arithmetic logical units ALU0–ALU3, each of which are controlled by opcode on line 100 which is derived from the route opcode unit 82 in FIG. 2. The 64 bit word supplied from source register 1 SRC1 contains four packed objects S1[0]–S1[3]. The 64 bit word supplied from source register 2 SRC2 contains four packed objects S2[0]–S2[3]. These are stored in first and second input buffers 90,92. The first arithmetic logic unit ALU0 operates on the first packed object in each operand, S1[0] and S2[0] to generate a result R[0]. The second to fourth arithmetic logic units ALU1–ALU3 similarly take the second to fourth pairs of objects and provide respective results R[1] to R[3]. These are stored in a result buffer 102. The result word thus contains four packed objects. An enable unit 101 determines if any of the unit should be active and controls whether the output buffer asserts its output.

The instructions are named as follows:

add2p Add each respective S1[i] to S2[i] as 2's complement numbers producing R[i]. Overflow is ignored.

sub2p Subtract each respective S2[i] from S1[i] as 2's complement numbers producing R[i]. Overflow is ignored.

cmpe2p Compare each respective S1[i] with S2[i]. If they are equal, set R[i] to all ones; if they are different, set R[i] to zero.

cmpge2ps Compare each respective S1[i] with S2[i] as signed 2's complement numbers. If S1[i] is greater than or equal to S2[i] set R[i] to all ones; if S1[i] is less than S2[i] set R[i] to zero.

mul2ps Multiply each respective S1[i] by S2[i] as signed 2's complement numbers setting R[i] to the least significant 16 bits of the full (32 bit) product.

Figure 5:
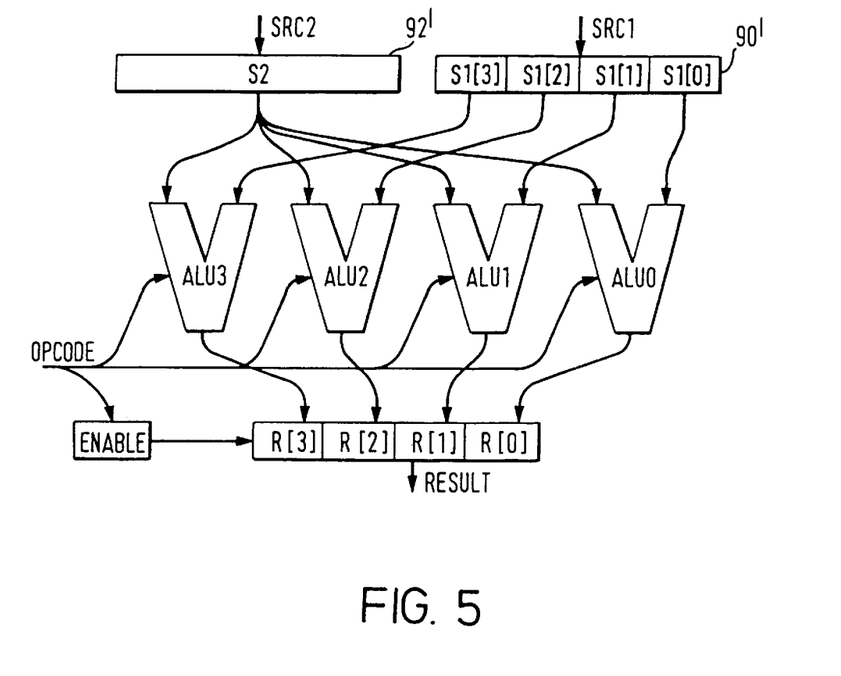
FIG. 5 is a block diagram of an obvious packed arithmetic unit which operates on a packed source operand and an unpacked source operand.

Some obvious packed arithmetic instructions naturally take one packed source operand and one unpacked source operand. FIG. 5 shows such a unit.

The contents of the packed arithmetic unit of FIG. 5 are substantially the same as that of FIG. 4. The only difference is that the input buffer 92' for the second source operand receives the source operand in unpacked form. The input buffer 90' receives the first source operand in packed form as before. One example of instructions using an unpacked source operand and a packed source operand are shift instructions, where the amount to shift by is not packed, so that the same shift can be applied to all the packed objects. Whilst it is not necessary for the shift amount to be unpacked, this is more useful.

shl2p Shift each respective S1[i] left by S2(which is not packed), setting R[i] to the result.

shr2ps Shift each respective S1[i] right by S2(which is not packed), setting R[i] to the result. The shift is signed, because the sign bit is duplicated when shifting.

It is assumed that the same set of operations are provided for packed 8 bit and packed 32 bit objects. The instructions have similar names, but replacing the "2" with a "1" or a "4".

Byte Replicate

Figure 6:
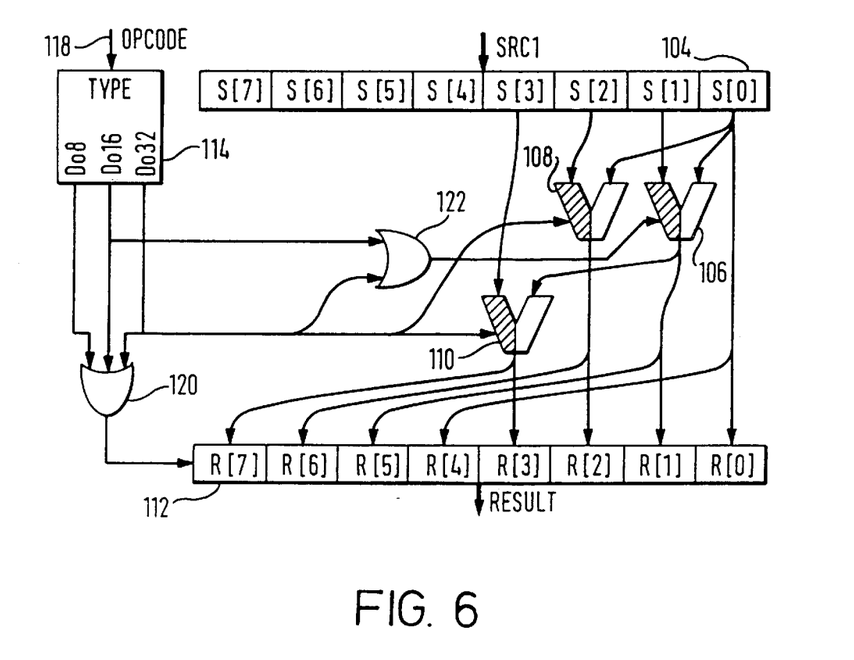
FIG. 6 shows a byte replicate unit.

FIG. 6 shows the byte replicate unit 70. The byte replicate unit comprises an input buffer 104 which receives a single operand which in FIG. 6 is illustrated as a 64 bit word comprising eight packed 8 bit objects S[0] to S[7]. A first multiplexor 106 receives as inputs the first object S[0] and the second object S[1]. A second multiplexor 106 receives as inputs the first object S[0] and the third object S[2]. A third multiplexor 110 receives as inputs the output of the first multiplexor 108 and the fourth object S[3]. The byte replicate unit also comprises an output buffer 112. The output buffer holds a 64 bit word packed as eight 8 bit objects R[0] to R[7]. The first and fifth 8 bit locations of the output buffer 112 are connected directly to the first 8 bits of the input buffer 104. The second and sixth 8 bit locations of the output buffer 112 are connected to receive the output of the first multiplexor 106. The third and seventh 8 bit locations of the output buffer 112 are connected to receive the output of the second multiplexor 108. The fourth and eighth 8 bit locations of the output buffer 112 are connected to receive the output of the third multiplexor 110. The 8 bit result objects in the output buffer are referred to as R[0] to R[7]. A type unit 114 receives opcode on line 118 derived from the route opcode unit 82 in FIG. 2. The type unit selects the size of the object to be replicated and provides one of three output signals D08,D016,D032. These output signals are supplied to an OR gate 120. The output of the OR gate enables the output buffer 112. The D016 and D032 signals are input to a second OR gate 122 the output of which controls the first multiplexor 106. The D032 signal itself controls the second and third multiplexors 108,110. The byte replicate unit thus takes the least significant object (8, 16 or 32 bits) of the source operand and replicates it 8, 4 or 2 times, to produce the packed 64 bit result held in output buffer 112. The operation is broken down into 8 bit pieces, each of S[i] and R[i] are 8 bits. Some logic is shared for the different replications. The type unit 114 determines whether to replicate 16 bit or 32 bit sequences. If neither signal Do16 or Do32 is asserted, 8 bit sequences will be replicated.

The three instructions supported by the byte replicate unit are:

rep1p Replicate S[0] into each of R[0] to R[7].

rep2p Replicate S[0] and S[1] into R[2i] and R[2i+1] for i from 0 to 3, thus replicating 16 bits.

rep4p Replicate S[0] to S[3] into R[4i] to R[4i+3] for i from 0 to 1, thus replicating 32 bits.

Bit Expansion

Figure 7:
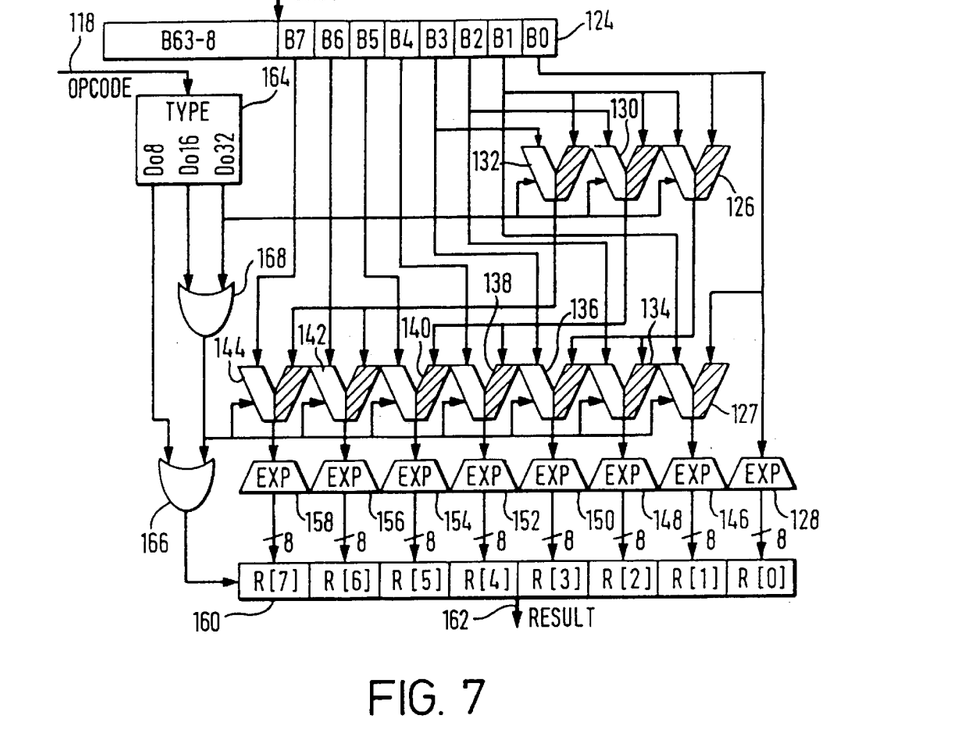
FIG. 7 shows a bit expansion unit.

FIG. 7 shows the bit expansion unit 78. This takes the least significant 8, 4 or 2 bits of the source operand and expands each 8, 16 or 32 times to produce a packed 64 bit result of 8, 16 or 32 bit objects. Some of the logic paths are shared between the different expansions.

The instructions performed by this unit are:

mask1p expand the eight least significant bits of the source operand 8 times each to produce a 64 bit result which consists of 8 packed 8-bit objects mask2p expand the four least significant bits of the source operand 16 times each to produce a 64 bit result which consists of 4 packed 16-bit objects mask4p expand the two least significant bits of the source operand 32 times each to produce a 64 bit result which consists of 2 packed 32-bit objects.

The bit expansion unit 78 comprises an input buffer 124 which in the described embodiment receives 64 bits from a register store. The 64 bit word is denoted as SRC1. The first eight bits are individually labelled B0 to B7 in FIG. 7. The first bit B0 is supplied to one input of a first multiplexor 126 and to a first expand unit 128. The first bit B0 is also supplied to one input of a second multiplexor 127. The second bit B1 is supplied to the second input of the first multiplexor 126 and to the first input of each of third and fourth multiplexors 130,132. The second bit B1 is also supplied to the second input of the second multiplexor 127.

The third bit B2 is supplied to the other input of the third multiplexor 130 and to one input of a fifth multiplexor 134.

The fourth bit B3 is supplied to one input of a sixth multiplexor 136 and to the other input of the fourth multiplexor 132. The fifth to eighth bits B4 to B7 are supplied respectively to inputs of seventh to tenth multiplexors 138 to 144.

The output of the first multiplexor 126 is supplied to the other input of the fifth and sixth multiplexors 134,136. The output of the third multiplexor 130 is supplied to the other input of the seventh and eighth multiplexors 138,140. The output of the fourth multiplexor 132 is supplied to the other inputs of the ninth and tenth multiplexors 142,144. The outputs of the second and fifth to tenth multiplexors are supplied to respective expand units 146 to 158. Each of these expand units have a single input signal and generate eight output signals which are replicates of the input signal. The output signals from the expand units are supplied to an output buffer 160 which holds respective result bytes R[0] to R[7]. These are supplied as the output of the bit expansion on result bus 162. A type unit 164 receives opcode on line 118 to select the type of instruction to be executed by the bit expansion unit. The type unit outputs three signals depending on the type of instruction selected, Do8, Do16 and Do32. The Do8 signal is supplied to an OR gate 166 the output of which controls the output buffer 160. The Do16 signal is supplied to an OR gate 168, the output of which is supplied to the OR gate 166. The Do32 signal is supplied to an input of the OR gate 168 and controls the first, third and fourth multiplexors 126,130 and 132. The output of the OR gate 168 controls the second and fifth to tenth multiplexors 127,134 to 144. This allows various logic paths to be shared.

When the bit expansion unit is implementing the mask1p instruction, the result is to replicate each of the first eight bits in the input buffer 124 to generate expanded bit sequences R[0] to R[7], each one byte long, in the result buffer 160.

Figure 8:
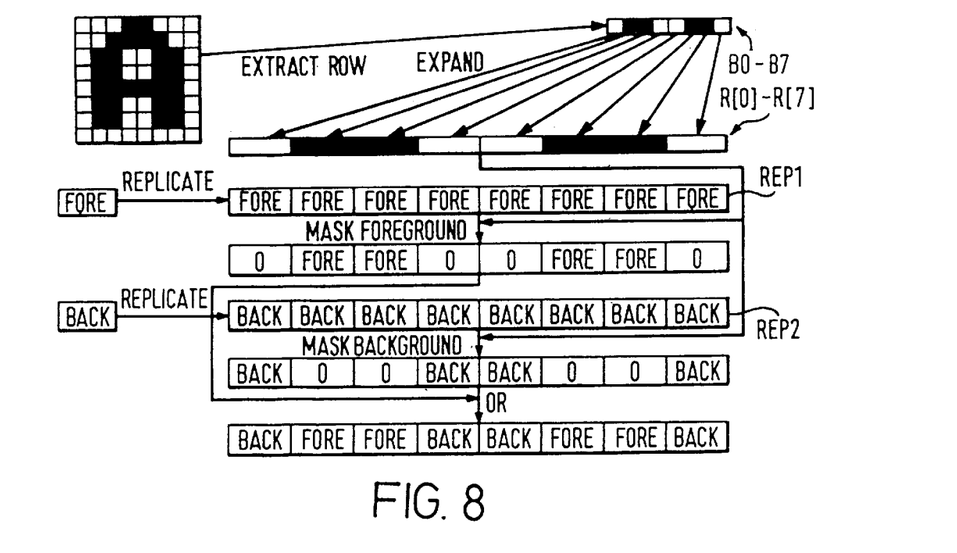
FIG. 8 shows the use of a bit expansion instruction to generate a set of pixel values for a character.

One example of use of a bit expansion instruction is in font expansion. Reference will now be made to FIG. 8 as an illustration of this application of the instruction. Fonts for characters and the like are often stored in memory using one bit per pixel, with a zero indicating the background and a one indicating the foreground. As an example, a character A is shown in FIG. 8 defined by ones in the foreground on a background of zeros. However, video display devices are often driven using several bits to define each pixel on the display, in order to display several colours simultaneously. Eight or thirtytwo bits are common lengths of bit sequences to define pixels.

In order therefore to display a font which is stored in the manner indicated in FIG. 8 on such a display device, it is necessary to expand the compressed font information to the required number of bits per pixel to drive the device. The bit expansion instruction described above can be used in this context to produce a mask consisting of all ones where the foreground colour should be placed and all zeros where the background colour should be placed. These masks can then be combined with representations of the foreground and background colours to create a set of pixel values for displaying the character on the display device.

In FIG. 8, the bit sequence defining each row of the stored font is extracted in turn. In FIG. 8, the third row is illustrated as being extracted. It will be appreciated that the instruction will already have been carried out on rows 1 and 2. The 8-bit sequence representing the third row is loaded in the least significant bit locations of a register in the register file. On execution of the bit expansion instruction, the contents of that register are loaded into the input buffer of the bit expansion unit. This carries out the expand operation denoted diagrammatically in FIG. 8. The contents of the output buffer 160 of the bit expansion unit are represented in FIG. 8 as result R[0]–R[7].

The expanded bit sequences R[0]–R[7] of the result are combined with a foreground representation Rep1 using a logical AND operation to generate a set of foreground pixel values. The expanded bit sequence is also combined with a background representation Rep2 using a logical AND operation to generate a set of background pixel values.

Finally, the set of foreground pixel values and the set of background pixel values are combined using a logical OR operation to create a set of pixel values for driving the display device.

The foreground representation consists of a set of bit sequences, each bit sequence having the same length as an expanded bit sequence in the result R[0]–R[7] and representing a foreground colour. The foreground representation can be generated by applying the replicate instruction referred to earlier to a foreground byte. The background representation can be similarly obtained. This is indicated diagrammatically in FIG. 8 by the use of the word replicate applied to a single foreground byte Fore and Back.

A code sequence for carrying out the operation described above is given in Annex A(i).

If the background is to be transparent, then the screen must be read before being updated, and its contents used to generate the background information. In that case, the loop code in the sequence of Annex A(i) is replaced by the loop code in the sequence of Annex A(ii).

Figure 9:
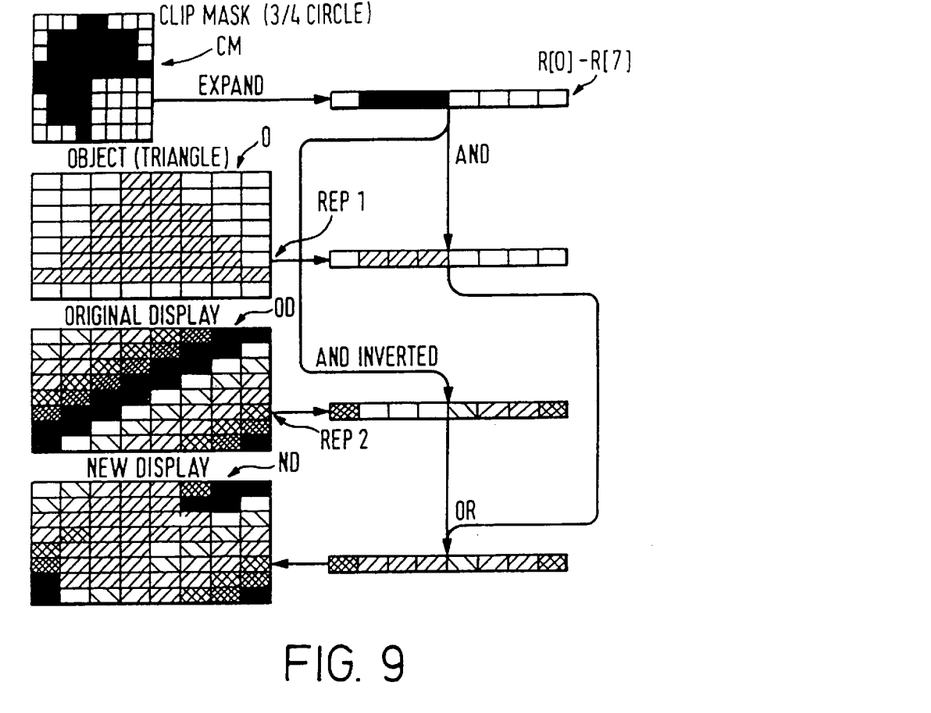
FIG. 9 shows an application of the bit expansion instruction for a clip mask.

Another application of the bit expansion instruction is to define a clip mask which is a region of the display within which an image can be defined.

FIG. 9 illustrates this application of the instruction.

A clip mask CM in the form of three-quarters of a circle is shown at the top of FIG. 9. The clip mask is defined as one bit per pixel in a data store. The black area (ones) defines the clip mask while the background is represented by zeros.

The next diagram down in FIG. 9 is the stored representation of an object O to be defined on the display within the clip mask. The object is a triangle. That object is defined as a pixel representation having a number of bit sequences, each bit sequence defining a pixel and having a length of eight bits.

The next diagram down in FIG. 9 is the original display OD, which is shown as having a plurality of different colours displayed on it, with each pixel being defined by a bit sequence of 8 bits.

To display the triangle within the clip mask, first the expand instruction is applied to each row of the clip mask. In FIG. 9 it is shown as being executed on row 6 and it will be appreciated that the same operation has been carried out on rows 1 to 5. The result of the bit expansion instruction R[0]–R[7] is combined with the corresponding row Rep1 of the defined object using a logical AND operation. This operation generates the second data string shown in FIG. 9. The result of the bit expansion instruction is also combined with row 6 (Rep2) of the original display using a logical inverted AND operation to generate the third data string in FIG. 9. Finally, the second and third data strings are combined using a logical OR operation to generate a set of pixel values for the new display. The result of these operations for rows 1 to 8 of the display are shown in the final diagram in FIG. 9, which represents the new display ND.

Figure 10:
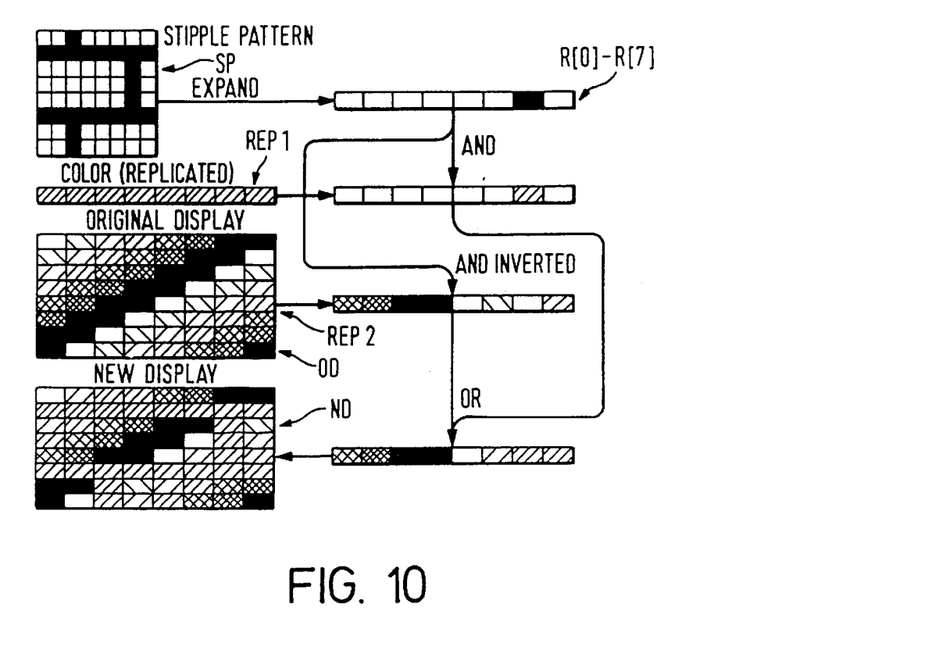
FIG. 10 shows the application of the bit expansion instruction to define a stipple pattern.

Another application of the bit expansion instruction is to fill in an area with two different colours according to a stipple pattern. Reference will now be made to FIG. 10 to illustrate this.

In FIG. 10, the first diagram represents the stipple pattern SP stored in memory as one bit per pixel. The stipple pattern is defined in black (ones) on a background of zeros.

A stipple pattern colour sequence Rep1 is generated using the replicate instruction as 8 bit sequences, each 8 bits long. Each row of the stored stipple pattern is subjected to the bit expansion instruction in turn. In FIG. 10, row 5 is shown as being expanded and it will be appreciated that the same sequence of events has been carried out on rows 1 to 4. The result R[0]–R[7] of the bit expansion instruction is combined with the colour sequence Rep1 for the stipple pattern using a logical AND operation to generate the second data string shown in FIG. 10.

The original display OD is shown as the third diagram in FIG. 10. The corresponding row 5 (Rep2) of the original display is combined with the expanded bit sequences using a logical inverted AND operation to generate the third data string in FIG. 10. Finally, the second and third data strings are combined using a logical OR operation to generate the corresponding row 5 of the new display. Thus, the stipple pattern of the required colour defined by the replicated colour sequence is generated on the display.

The stipple pattern in the example of FIG. 10 is reminiscent of brickwork. The stipple pattern can be repeated ad infinitum in both the vertical and horizontal directions. Thus, for this example, the mortar between bricks of the display would be coloured.

---

ANNEX A(i)

```
;code to render fonts of 8 x 8 pixel characters onto screen
;R1 holds pointer to compressed font table
;R3 holds pointer to top left corner of character target on screen
;R4 holds increment to get to next row on the screen
;R5 holds foreground color
;R6 holds background color
replp   R5, R5           ;duplicate up the foreground color
replp   R6, R6           ;duplicate upt the background color
load    R7, R1           ;load all 64 bits of character defn
mov     R8, 8            ;repetition counter
loop:

masklp  R9, R7           ;expand 8 bits of character row
and     R10, R9, R5      ;mask foreground
andn    R11, R9, R6      ;mask background
or      R12, R10, R11    ;combined foreground & background
store   R12, R3          ;store one row of character
add     R3, R3, R4       ;move to next screen line
shr     R9, R9, 8        ;shift font pattern down by 8 bits
sub     R8, R8, 1        ;decrement loop counter
jnz     R8, loop         ;repeat if not complete
```

---

ANNEX A(ii)

```
masklp  R9, R7           ;expand 8 bits of character row
and     R10, R9, R5      ;mask foreground
load    R6, R3           ;read screen contents
andn    R11, R9, R6      ;mask background
or      R12, R10, R11    ;combine foreground & background
store   R12, R3          ;store one row of character
```

---

What is claimed is:

1. A method of generating a data string in a register store having a predetermined bit capacity addressable by a single address, the method comprising:
   identifying a bit string having a bit length matching the predetermined bit capacity and having a plurality of adjacent bit sequences each having the same selectable number of bits, wherein the adjacent bit sequences are arranged in the identified bit string in an ordered manner between a most significant bit sequence and a least significant bit sequence;
   selecting said least significant bit sequence; and
   replicating each bit of said least significant bit sequence at a selectable plurality of adjacent locations in said register store to generate said data string having a bit length matching said predetermined bit capacity and comprising said number of expanded bit sequences, each of said expanded bit sequences comprising a plurality of said replicated bits.

2. A method according to claim 1 wherein prior to selection of bits of said bit sequence said identified bit string is held in a register store having a bit capacity addressable by a single address and which is the same as said predetermined bit capacity.

3. A method according to claim 1 wherein said register store has 64 bit locations, the number of bits is eight and each expanded bit sequence is one byte long.

4. A method according to claim 2 or 3 wherein a first such register store holds the identified bit string and a second such register store provides the successive locations for the generated data string.

5. A method according to claim 1 wherein said bits are replicated in said adjacent locations simultaneously via a plurality of respective data paths.

6. A method of operating a computer which method comprises holding in data storage a plurality of bit sequences each forming one of a plurality of sub-strings of a data string, wherein the sub-strings are arranged in an ordered sequence in said data string between a most significant sub-string and a least significant sub-string, said method further comprising:
   selecting said least significant sub-string; and
   executing an instruction sequence including at least one expand instruction, the or each expand instruction replicating each bit of said least significant sub-string at a plurality of adjacent locations in a register store having a predetermined bit capacity addressable by a single address to generate a new data string having a bit length matching said bit capacity and comprising a number of expanded bit sequences, each of said expanded bit sequences comprising a plurality of said replicated bits, wherein the bit length of the selected sub-string and said plurality of replicated bits are selectable and are determined by the expand instruction.

7. A method according to claim 6 wherein each data string has a predetermined bit length which is the same as the predetermined bit length of the new data string.

8. A computer comprising a processor, memory and data storage circuitry for holding bit sequences each forming a sub-string within a data string, said computer having stored in said memory an instruction sequence comprising a first instruction which selects one of said sub-strings within the data string and replicates each bit of the selected sub-string at a plurality of adjacent locations to generate a new data string comprising a number of sub-strings each comprising a plurality of replicated bits, and a second instruction which designates a common operation on at least some sub-strings of the new data string without identification of said sub-strings within the data string,
   wherein said bit sequences form sub-strings in an ordered manner between a most significant sub-string and a least significant sub-string, and wherein said first instruction selects said least significant sub-string.

9. A computer according to claim 8 wherein the data string and the new data string have a common predetermined bit length.

10. A computer according to claim 8 or 9 which comprises a register store having a predetermined bit capacity addressable by a single address for holding said new data string prior to execution of said second instruction.

11. A computer according to claim 8 wherein the data string is held in an input buffer and the new data string is generated in an output buffer by simultaneous replication of bits of said selected sub-string via a plurality of respective data paths located between said input buffer and said output buffer.

12. A computer according to claim 8 wherein said instruction sequence includes a further instruction designating a common operation on sub-strings of said data string without identification of said sub-strings within the data string, said further instruction being located in said instruction sequence for execution prior to said first instruction.

13. A method of operating a computer which method comprises holding in data storage a plurality of bit sequences each forming one of a plurality of sub-strings of a data string, executing a first instruction which selects at least one of said sub-strings within the data string and replicates each bit of the selected sub-string at a plurality of adjacent locations to generate a new data string consisting of a number of sub-strings each comprising a plurality of replicated bits, and executing a second instruction which effects a common operation on at least some sub-strings of the new data string without identification of said sub-strings within the data string.

14. A method according to claim 13 wherein the new data string generated by the first instructions has a predetermined bit length matching that of the data string.

15. A method according to claim 13 or 14 wherein said new data string is held in a register store having a predetermined bit capacity addressable by a single address prior to execution of said second instruction.

16. A method according to claim 13 wherein the data string is held in an input buffer and the new data string is generated in an output buffer by simultaneous replication of bits of said selected sub-string via a plurality of respective data paths located between said input buffer and said output buffer.

17. A method according to claim 17 which comprises, prior to execution of said first instruction, executing a further instruction which effects a common operation on sub-strings of said data string without identifying separate sub-strings within the data string.

18. A method according to claim 13, wherein said bit sequences form sub-strings in an ordered manner between a most significant sub-string and a least significant sub-string, and wherein said first instruction selects said least significant sub-string.

19. A method of generating a set of pixel values for defining the display status of a plurality of pixels of a display having first and second display regions, the method comprising:

identifying in a computer store a bit sequence comprising a number of bits, each bit indicating whether a pixel represented by that bit lies in the first or second display region;

generating a data string from said bit sequence by replicating each bit of said bit sequence at a plurality of adjacent locations whereby said data string consists of said number of expanded bit sequences, each comprising a plurality of said replicated bits;

combining said data string, using a logical AND operation, with at least one other data string consisting of a number of bit sequences, each bit sequence having the same number of bits as each said expanded bit sequence, and each bit sequence of the other data string representing the colour of one of the first and second display regions to generate a first pixel representation for that display region, said first pixel representation providing said set of pixel values.

20. A method according to claim 19 wherein said data string is also combined using a logical AND representation, with a second other data string to generate a second pixel representation and wherein said first and second pixel representations are combined using a logical OR operation to generate said set of pixel values.

21. A method according to claim 20 wherein the first display region of the display defines a clip mask within the second region of the display.

22. A method according to claim 20 wherein the first region of the display is selected to define a stipple pattern in a first colour, the second region of the display being in a second colour.

23. A method according to claim 20 wherein the first region of the display is a foreground region defining a character and the second region of the display is a background region.

24. A method according to claim 19, wherein the bit sequence is selected from a plurality of bit sequences, said plurality of bit sequences together forming a bit stream having a length equal to a storage length of the computer store; and wherein the data string generated by replicating each bit of said selected bit sequence has the same length as the bit stream.

25. A method according to claim 24, wherein adjacent bit sequences are arranged in the bit stream in an ordered manner between a most significant bit sequence and a least significant bit sequence, and wherein said selected bit sequence is the least significant bit sequence.

26. A method of generating a data string having a predetermined length, the method comprising:

providing a bit string having the predetermined length;
segmenting the bit string into a plurality of sub-strings;
selecting a least significant sub-string; and
expanding the least significant sub-string to form the data string with the predetermined length.

* * * * *